United States Patent
Lhila et al.

(10) Patent No.: US 6,841,234 B2
(45) Date of Patent: Jan. 11, 2005

(54) HEAT-ACTIVATED ADHESIVE TAPE HAVING AN ACRYLIC FOAM-LIKE BACKING

(75) Inventors: Ramesh Lhila, Blackburn (GB); Kwang-Yol Park, Boryung-shi (KR); Kaila Delpozzo, Westfield, MA (US); Jian Ling Ding, Glastonbury, CT (US)

(73) Assignee: Scapa Tapes North America Inc., Windsor, CT (US)

( * ) Notice: Subject to any disclaimer, the term of this patent is extended or adjusted under 35 U.S.C. 154(b) by 0 days.

(21) Appl. No.: 09/920,182

(22) Filed: Aug. 1, 2001

(65) Prior Publication Data

US 2002/0028326 A1 Mar. 7, 2002

Related U.S. Application Data

(60) Provisional application No. 60/223,029, filed on Aug. 4, 2000.

(51) Int. Cl.$^7$ ................................................ B32B 7/12
(52) U.S. Cl. ................ 428/317.3; 428/317.5; 428/343; 428/355 EN; 428/355 N; 525/218; 524/272
(58) Field of Search ......................... 428/317.5, 343, 428/345, 355, 312.6, 315.9, 317.3; 525/218, 212; 524/272

(56) References Cited

U.S. PATENT DOCUMENTS

| | | | |
|---|---|---|---|
| 3,314,838 A | 4/1967 | Erwin | |
| 3,993,833 A | 11/1976 | Esmay | |
| 4,181,752 A | 1/1980 | Martans et al. | |
| 4,223,067 A | 9/1980 | Levens | |
| 4,303,485 A | 12/1981 | Levens | |
| 4,307,142 A * | 12/1981 | Blitstein et al. | 428/143 |
| 4,415,615 A | 11/1983 | Esmay et al. | |
| 4,484,574 A | 11/1984 | DeRusha et al. | |
| 4,780,491 A | 10/1988 | Vesley et al. | |
| 4,895,745 A | 1/1990 | Vesley et al. | |
| 4,968,558 A | 11/1990 | Fisher et al. | |
| 5,024,880 A | 6/1991 | Veasley et al. | |
| 5,183,833 A | 2/1993 | Fisher et al. | |
| 5,264,278 A * | 11/1993 | Mazurek et al. | 428/317.3 |
| 5,322,709 A | 6/1994 | Lulla et al. | |
| 5,334,447 A | 8/1994 | Kitamura et al. | |

(List continued on next page.)

FOREIGN PATENT DOCUMENTS

| | | |
|---|---|---|
| CA | 747341 | 11/1966 |
| EP | 0 319 155 A2 | 11/1988 |
| EP | 0 324 242 A2 | 12/1988 |
| EP | 0 426 198 A2 | 11/1990 |
| WO | WO 92/15394 | 9/1992 |
| WO | WO 95/29811 | 11/1995 |

*Primary Examiner*—Terrel Morris
*Assistant Examiner*—Hai Vo
(74) *Attorney, Agent, or Firm*—McCormick, Paulding & Huber LLP

(57) ABSTRACT

Heat-activated adhesive tape has a backing comprising 88–92% acrylic polymer containing: 35–45% of a first alkyl acrylate monomer with alkyl groups containing 4 to 12 carbon atoms, 30–40% of a second alkyl acrylate monomer with alkyl groups containing 4 to 12 carbon atoms, 6–10% a first monoethylenically unsaturated polar copolymerizable monomer, 1–2% a second monoethylenically unsaturated polar copolymerizable monomer, 0.3–0.5% photoinitiator, 1–2% filler, 0.05–0.07% crosslinker/chain extender, and 8–12% hollow glass microspheres; and heat-activated adhesive layer on at least one side. A pressure-sensitive adhesive may be on the other side. A method for preparing the adhesive tape involves partially polymerizing an oligomer, forming a coating composition, coating the composition onto a heat-activated adhesive disposed on a liner with a second liner, which may have a heat-activated adhesive, contiguously covering the first liner, and polymerizing the composition on the liners between two banks of ultraviolet light while cooling to form a tape.

21 Claims, 1 Drawing Sheet

U.S. PATENT DOCUMENTS

| | | | | |
|---|---|---|---|---|
| 5,521,227 A | * | 5/1996 | Palazzotto et al. | 522/4 |
| 5,605,717 A | | 2/1997 | Simmons et al. | |
| 5,611,881 A | * | 3/1997 | Kimura et al. | 156/241 |
| 5,612,136 A | * | 3/1997 | Everaerts et al. | 428/355 AK |
| 5,683,798 A | | 11/1997 | Bennett et al. | |
| 5,695,837 A | * | 12/1997 | Everaerts et al. | 428/40.1 |
| 5,883,149 A | | 3/1999 | Bennett et al. | |
| 5,902,836 A | | 5/1999 | Bennett et al. | |
| 5,922,428 A | | 7/1999 | Pufahl | |

* cited by examiner

HEAT-ACTIVATED ADHESIVE TAPE HAVING AN ACRYLIC FOAM-LIKE BACKING

RELATED APPLICATIONS

The present application claims priority from the provisional U.S. patent application Ser. No. 60/223,029, filed on Aug. 4, 2000, and from the non-provisional U.S. patent application filed Jul. 3, 2001 entitled "Acrylic Foam-Like Tape".

BACKGROUND OF THE INVENTION

The present invention relates to adhesive tapes. In particular, the present invention relates to an adhesive tape having a foam-like backing, at least one layer of heat-activated adhesive on at least one side thereof, and, optionally, at least one layer of pressure-sensitive adhesive on the side thereof opposite the layer of heat-activated adhesive, and to a process for making the tape.

Single- and double-sided adhesive tapes are known which have a heat-activated adhesive on the first side of a compressible backing and, for double-sided tapes, a pressure-sensitive adhesive on the second side of the backing. Typically, the compressible backing is a foam backing wherein the backing has a cellular structure consisting of gas pockets dispersed throughout the backing. One of the deficiencies of the prior art is the limited range of surfaces to which they will bind. Furthermore, the backing and heat-activated adhesive may become separated because the adhesive is typically laminated or coated directly on a pre-fabricated foam backing, and conventional foam backings break apart under stress and over time.

Heat-seal adhesives are dry coatings on the back of flexible laminates. They are heat sealed to panels by rollers or quick presses at elevated temperatures and pressures. These adhesives may be applied and dried by the laminate producer using water or solvent based polymers. Heat seal adhesives adhere to most surfaces and form very tough bonds.

U.S. Pat. No. 5,922,428 issued to Pufahl on Jul. 13, 1999 shows a sterilizable package with an improved seal. The package utilizes an adhesive tape having a first adhesive layer formed from a heat-seal adhesive, and a second adhesive layer formed from a pressure-sensitive adhesive. A carrier layer composed of a polyester or other polymeric material is disposed between the two adhesive layers. The heat-seal adhesive is applied to the carrier layer in a molten state. Because the carrier layer is already fully polymerized, the heat-seal adhesive layer may become separated therefrom.

A hot-melt adhesive, on the other hand, is an adhesive which is a 100% solids thermoplastic and is applied molten to form a bond upon cooling. Hot melts differ from conventional liquid adhesives because they set by cooling rather than by absorption or evaporation. It is well-known to pre-coat liners with the hot-melt adhesive and then reactivate the adhesive by heat. Furthermore, it is conventional to utilize the pre-coated liners to laminate the hot-melt onto another substrate.

Hot-melt adhesives are employed in many nonstructural applications. Based on thermoplastic resins, which melt at elevated temperatures without degrading, these adhesives are applied as hot liquids to an adherend. Hot-melts are non-volatile adhesives that are solid at room temperature, liquify upon heating, and resolidify with cooling forming nearly instantaneous bonds. These adhesives are widely used in the automotive and home-appliances fields.

U.S. Pat. No. 5,322,709 issued to Lulla et al. on Jun. 21, 1994 discloses a process for production of a pressure sensitive hot melt-adhesive coated tape, which process incorporates a blowing agent into the hot-melt adhesive, and subsequently decomposes the blowing agent forming a hot melt coating having a cellular structure. The process involves coating the hot melt adhesive composition onto a paper or plastic film tape backing either via extrusion or a line technique. The invention of Lulla et al. applies the hot-melt adhesive directly to the pre-fabricated tape backing as a coating thereon, which does not address the concern that the adhesive and a foam backing may become separated during use.

U.S. Pat. No. 5,605,717 issued to Simmons et al. on Feb. 25, 1997 describes a process for foaming a hot-melt adhesive using moisture in a backing. The hot-melt adhesive is extruded onto a coextrudate (the backing material) and as the water in the coextrudate evaporates self-contained bubbles of water vapor are formed in the adhesive producing a foamed hot-melt adhesive on a backing. Foamed hot-melt adhesives are inherently less reliable than non-foamed hot-melt adhesives, as they are more brittle.

None of the above inventions and patents, taken either singularly or in combination, is seen to describe the instant invention as claimed.

SUMMARY OF THE INVENTION

The present invention relates to a heat-activated adhesive tape having a foam-like backing, at least one layer of a heat-activated adhesive on a first side of the backing, and, optionally, a layer of pressure-sensitive adhesive on a second side thereof. Alternatively, both the first and second sides of the backing may have a layer of heat-activated adhesive disposed thereon. The heat-activated adhesive layers may be different or the same. A process for making the heat-activated tapes is also included as part of the present invention.

Accordingly, it is a principal object of the present invention to provide a compressible heat-activated adhesive tape with a foam-like acrylic backing which can be used in place of conventional foam backed tapes. The heat-activated adhesive tapes of the current invention can be used wherever such tapes are used.

Conventional pressure-sensitive adhesives do not adhere to many surfaces therefore it is desirable to have a compressible tape which will adhere to these surfaces. It is an object of the invention to provide a compressible heat-activated adhesive tape that will bond to surfaces to which pressure-sensitive adhesives will not adhere.

A further object of the invention is to provide a compressible foam-like adhesive which will permanently adhere via the heat-activated adhesive to the surface of an object. The heat-activated adhesive tapes of the present invention provide permanent adhesion to most surfaces to which they are applied. Furthermore, the present invention allows the tailoring of the characteristics of the heat-activated adhesive tape according to the intended use. The choice of heat-activated adhesive and pressure-sensitive adhesive, if applicable, determines the adhesion characteristics of the tape.

Still another object of the present invention is to provide a heat-activated adhesive tape in which the heat-activated adhesive layer will not become separated from the foam-like backing. The unique manner in which the tape is made radically reduces the chance that the heat-activated adhesive will separate from the foam-like backing.

These and other objects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

Similar reference characters denote corresponding features consistently throughout the attached drawings.

DETAILED DESCRIPTION OF THE PREFERRED EMBODIMENTS

Figure 1:
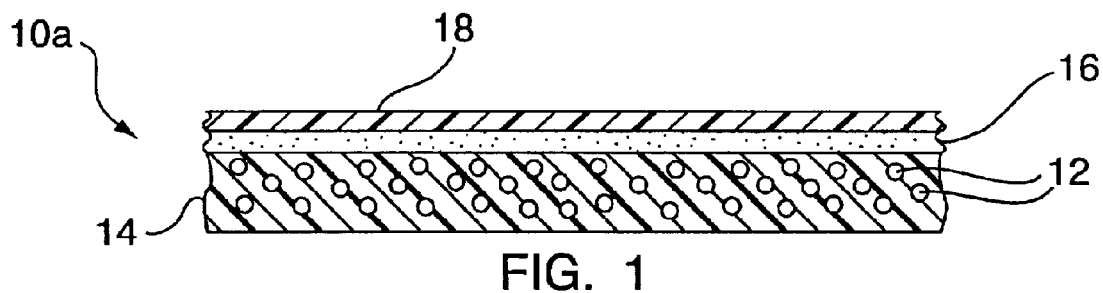
FIG. 1 is a cross-sectional view of one embodiment of the present invention.

An adhesive tape having a foam-like backing with at least one layer of a heat-activated adhesive on at least one side of the backing and, optionally, a layer of adhesive on the other side of the foam-like backing opposite the heat-activated adhesive wherein the second layer of adhesive may be either a heat-activated adhesive or a pressure-sensitive adhesive. The present invention is related to the non-provisional U.S. patent application Ser. No. 09/898969, filed Jul. 3, 2001, entitled "Acrylic Foam-Like Tape", and assigned to Scapa Tapes North America, Inc., the contents of which are incorporated herein by reference in their entirety.

The foam-like adhesive tape of the present invention contains: (a) a layer of an acrylic foam-like backing comprising (i) from about 88% to about 92% of an acrylic polymer containing: from about 35% to about 45% of a first alkyl acrylate monomer wherein the alkyl groups contain from 4 to 12 carbon atoms, from about 30% to about 40% of a second alkyl acrylate monomer wherein the alkyl groups contain from 4 to 12 carbon atoms, from about 6% to about 10% of a first monoethylenically unsaturated polar copolymerizable monomer, from about 1% to about 2% of a second monoethylenically unsaturated polar copolymerizable monomer, from about 0.3% to about 0.5% of a photoinitiator, from about 1% to about 2% of a filler, from about 0.05% to about 0.07% of a crosslinker/chain extender, and (ii) from about 8% to about 12% of hollow glass microspheres dispersed evenly in the polymer; and (b) at least one layer of a heat-activated adhesive disposed on at least a first side of the foam-like backing. Each alkyl acrylate monomer is a monofunctional, unsaturated acrylate ester of a non-tertiary alkyl alcohol, the molecules of which have from about 4 to 12 carbon atoms. Optionally, a pressure-sensitive adhesive layer can be disposed on a second side of the backing, or a second heat-activated adhesive layer may be disposed on the other side of the backing thus forming a double-sided adhesive tape. If the tape has two heat-activated adhesive layers disposed on opposite sides of the backing the heat-activated adhesives may be the same or different.

As used herein, all percentages (%) are percent weight to weight, also expressed as weight/weight %, % (w/w), w/w, w/w % or simply %, unless otherwise indicated.

Included within the class of alkyl acrylate monomers are, for example, isooctylacrylate, isononylacrylate, 2-ethylhexyl acrylate, decylacrylate, dodecylacrylate, butylacrylate and hexylacrylate. The most preferred alkyl acrylate monomers are isooctylacrylate (available as Norsocryl®ioa from Elf Atochem® in France) as the first monomer and 2-ethylhexyl acrylate (available from LG Chem® in Korea) as the second monomer. Isononylacrylate can be substituted for isooctylacrylate, and butylacrylate, though less preferred, may also be substituted for isooctylacrylate.

The polar copolymerizable monomers can be selected from strongly polar monomers such as acrylic acid, itaconic acid, hydroxyalkyl acrylates, cyanoalkyl acrylates, acrylamides or substituted acrylamides, or from moderately polar monomers, though not preferred, such as N-vinyl pyrrolidone, N-vinyl caprolactam, acrylonitrile, and vinyl chloride. The most preferred copolymerizable monomers are acrylic acid (also available from LG Chem® in Korea) as the first monomer and acrylamide as the second monomer.

The proper photoinitiator, or a combination of photoinitiators, is important for the overall process because photoinitiators absorb and utilize the light energy to initiate photopolymerization. Suitable photoinitiators include those typically used in the polymerization of vinyl compounds. Other photoinitiators which may be substituted for the preferred benzoin ethyl ether (available from Seiko Chemical Co., Ltd. in Japan) include other acyloin ethers, such as benzoin isopropyl ether, anisoin ethyl ether, and anisoin isopropyl ether, and substituted acyloin ethers, alpha-hydroxymethyl benzoin ethyl ether. Using only one photoinitiator permits the wavelength of the ultraviolet source to be matched to the peak energy-absorbing wavelength of the photoinitiator. Long wavelength activatable photoinitiators allow UV radiation from UV lamps, having the long wavelength, to penetrate deeper in the coating materials, and is therefore suitable for a thicker adhesive coating. One or more photoinitiators may be used in the present invention.

A crosslinker/chain extending agent is used to increase the molecular weight of the polymer by increasing the length of the polymer chains, and to create a network of polymer chains crosslinked so as to decrease creep. The crosslinker/chain extending agent can be a multi-ethylenically unsaturated copolymerizable monomer containing at least two carbon-carbon double bonds. Such agents may include multifunctional acrylates and methacrylates thereof which include, but are not limited to, ethylene glycol diacrylate, triethylene glycol diacrylate, 1,4-butanediol diacrylate, 1,6-hexanediol diacrylate, trimethylolpropane triacrylate, pentaerythritol triacrylate, and methacrylacrylates thereof, and tetraethylene glycol diacrylate and its demethacrylate. The preferred agent is 1,4 butanediol diacrylate available from Sartomer® in the United States as SR-213.

Fumed silica is utilized in the present invention as a filler to lower the density of the foam-like backing. It is noted that fumed silica is also a thixotropic agent which may be used to increase the viscosity of a mixture of monomers or oligomers. Fumed silica is available from Carbot® in the United States under the name M-5 Cab-O-Sil™. The average particle size is 0.2–0.3 microns. Other silicas may also be used, such as hydrophilic or hydrophobic group modified silicas which are referred to herein as surface modified silica.

Hollow glass microspheres such as borosilicate glass are used in the present invention to create discrete pockets of air. The borosilicate glass is available from Tokai Kogyo® in Japan as Z-27 Celstar®. The average particle size is 40–70 microns. These discrete pockets facilitate the ultraviolet polymerization of a thicker backing layer and aid in the compressibility and recovery of the resultant backing. No other voids are present in the backing layer of the present invention. Although voids may be present as an imperfection, in no circumstance are voids present in amounts as high as 15% by volume. High void content reduces the strength of the resulting pressure-sensitive adhesive tapes. The backing is a continuous, solid heteropolymer layer which contains hollow glass microspheres dispersed therein with no other voids.

In the preferred embodiment of the acrylic foam-like backing, the first alkyl acrylate monomer is isooctylacrylate, the second alkyl acrylate monomer is 2-ethylhexyl acrylate, the first monoethylenically unsaturated polar copolymerizable monomer is acrylic acid, the second monoethylenically unsaturated polar copolymerizable monomer is acrylamide, the photoinitiator is benzoin ethyl ether, the filler is fumed silica, the crosslinker/chain extender is 1,4 butanediol diacrylate, and the hollow glass microspheres are borosilicate glass. In the most preferred embodiment, the acrylic foam-like backing contains about 40.5±1% isooctylacrylate, about 36.5±1% 2-ethylhexyl acrylate, about 8.5±1% acrylic acid, about 1.5±1% acrylamide, about 0.40±0.01% benzoin ethyl ether, about 1.5±1% fumed silica, about 0.060±0.001% 1,4 butanediol diacrylate, and about 10.5±1% borosilicate glass.

The density of the foam-like backing may be controlled by varying the amount of silica gel and hollow glass microspheres mixed with the oligomer. A desirable density can be obtained without undue experimentation. Typically, the density is in the range of 700–900 kg/m$^3$. The primer and the adhesives utilized are discussed below.

Furthermore, colorant which is either dyes or pigments may be present in sufficient quantities to depart color to the adhesive tape. Carbon black, for example, may be used to give the tape a darker appearance.

At least one heat-activated adhesive layer is present on at least one surface of the foam-like backing. The term heat-activated adhesive is understood to include heat-seal adhesives and hot-melt adhesives. The present invention contemplates all suitable heat-activated adhesives which can be applied to a release liner.

Heat-seal adhesives are typically not tacky at room temperature. No distinction is made herein between pressure-sensitive hot-melt adhesives and hot-melt adhesives; both are referred to as hot-melt adhesives.

Suitable polymers in hot-melt adhesives include polyamides, polyesters, ethylene-vinyl acetate, polyurethanes, and a variety of block copolymers and elastomers such as butyl rubber, ethylene-propylene copolymer, and styrenebutadiene rubber. In order to improve performance at higher temperatures, above 65° C. (150° F.), so-called structural hot-melts—thermoplastics modified with reactive urethanes, moisture-curable urethanes, or silane-modified polyethylene—have been developed.

Suitable heat-seal adhesives are based on thermoplastic polymers such as polyolefins (e.g., polyethylene, polypropylene and their copolymers), ethylenevinyl acetate copolymers, vinyl acetate-vinyl chloride, urethane, polyamides, polyesters, and block copolymer rubbers. Flow characteristics and other properties of the thermoplastic polymer are typically modified by the addition of waxes, oils, terpene resins, and rosin derivatives, for example. Generally, heat-seal adhesives are not tacky until heated to a certain minimum activation temperature. Any of these adhesives are suitable for use with the present invention. It is understood that modifiers are frequently present in the heat-activated adhesives utilized in the current invention. These modifiers are not limited to those depicted above.

In particular, the modified vinyl coatings with polyester resin available from Morton International Inc. (United States) under the trade names Adcote® 1640 and Adcote® 35K1 are especially suitable heat-seal adhesives to make the heat-activated adhesive layer of the present invention. Other suitable products from Morton International Inc. include the modified vinyl coatings Adcote® 35K1A which has lower solids content, Adcote® 35K2A which has lower solids and higher peel, Adcote® 2730-2B which has lower activation temperature, and Adcote® 35K1E which is an ethyl acetate based version.

The vinyl acetate-ethylene emulsions available from Air Products and Chemicals, Inc. (United States) under the trade name Airflex®, especially Airflex® 7200, are also preferred heat-seal adhesives to make the heat-activated adhesive layer of the present invention. Other suitable products from Air Products and Chemicals, Inc. include the ethylene-vinyl chloride emulsions also available under the trade name Airflex®, the polyvinyl acetate homopolymer emulsions available under the trade name Vinac®, the polyvinyl acetate homopolymer and copolymer beads also available under the trade name Vinac®, the polyvinyl acetate copolymer and acrylic emulsions available under the trade name Flexbond®, and the polyvinyl alcohol adhesives (and modifiers) available under the trade name Airvol®

Furthermore, numerous products are available from Bostick® which are either heat-seal or hot-melt adhesives and are well suited for use as the heat-activated adhesive layer of the current invention. The Vitel® resins are very useful as heat-seal adhesives, and the Vitel® copolyesters are excellent hot-melt adhesives. Other hot melt adhesives available from Bostick® include copolyamide, pressure sensitive, and polyolefin adhesives. Laminating adhesives, heat activated adhesives and heat seal coatings are also available which are suitable heat activated adhesives. In addition to the polyester adhesives, Bostick® provides numerous modifiers including the curing agents available under the trade name Boscodur®, primers, and solvent based curatives.

Furthermore, an adhesive layer may be present on one surface of the foam-like backing opposite the surface having the heat-activated adhesive thereon, or a second heat-activated adhesive layer may be disposed on the second surface. Suitable adhesive are preferably solution acrylic adhesives which include, but are not limited to, NSCC Duro-tak® 80-1105 LSE (National Starch and Chemical, United States), Gelva Multipolymer Solution 2933 or Gelva® Multipolymer Solution 2465 (Solutia Inc.), Duro-tak® 80-1077, 80-1093, 80–1099 and 80–1096 (National Starch and Chemical, United States), Aroset 1810, 1085, 280,458, 390M, and 399 (Ashland Chemical, United States), and Gelva® Multipolymer Solutions 1753 and 2659 (Solutia Inc.)

The method for making the pressure-sensitive adhesive tapes according to the present invention involves several steps. The first step is to prepare an oligomer composition from a monomer mixture while substantially excluding oxygen, and partially polymerizing the oligomer composition. The preferred method of excluding oxygen from the monomer mixture is by bubbling nitrogen therethrough.

The oligomer composition contains about 45% to about 55% of a first alkyl acrylate monomer wherein the alkyl groups contain from 4 to 12 carbon atoms, about 35% to about 45% of a second alkyl acrylate monomer wherein the alkyl groups contain from 4 to 12 carbon atoms, about 3% to about 4% of a first monoethylenically substituted monomer, and about 0.04% to about 0.06% of a photoinitiator. Preferably the oligomer composition contains 51±1% isooctylacrylate, 45±1% 2-ethylhexyl acrylate, 3.5±1% acrylic acid, and 0.04±0.01% benzoin ethyl ether.

In order to partially polymerize the monomer mixture to form an oligomer composition, it is preferred to extrude the monomer mixture through a 4" diameter glass tube under ultraviolet radiation sufficient to initiate partial polymerization resulting in an oligomer having a viscosity of about 80 cps. The ultraviolet radiation is preferably generated by four ultraviolet lamps evenly surrounding the glass tubing. Preferably, the ultraviolet lamps, such as Model No. F40/BL (40 W) available from Phillips®, have wavelength ranges from about 300 nm to about 400 nm peaking at about 356.0 nm with the majority of the ultraviolet light being in the wavelength of 356 nm to 365 nm. Alternative methods of polymerization, such as thermal polymerization, may be utilized to make the oligomer by mixing the monomers and a suitable initiator.

Next, a coating composition is formed by combining about 75% to about 80% by weight of the oligomer made in the first step, and a mixture having a first polar copolymerizable monoethylenically substituted monomer and a second polar copolymerizable monoethylenically substituted monomer having a combined weight percentage of about 6% to about 9%, about 0.3% to about 0.5% of at least one photoinitiator, about 1% to about 2% filler agent, about 0.05% to about 0.07% of a crosslinker/chain extender, and about 8% to about 12% hollow glass microspheres. If desirable, colorant may be added to the coating composition in order to depart color thereto.

Preferably, in the mixture added to the oligomer, the first polar copolymerizable monoethylenically substituted monomer is acrylic acid and the second polar copolymerizable monoethylenically substituted monomer is acrylamide, the photoinitiator is benzoin ethyl ether, the filler is fumed silica, the crosslinker/chain extender is 1,4 butanediol diacrylate, and the hollow glass microspheres are borosilicate glass. Most preferably, the mixture contains about 5.5% to about 6.5% acrylic acid, about 1% to about 2% acrylamide, about 0.35% to about 0.45% benzoin ethyl ether, about 1% to about 2% fumed silica, about 0.055% to about 0.065% 1,4 butanediol diacrylate, and about 10% to about 11% borosilicate glass wherein the borosilicate glass is from about 40 to about 70 microns.

It is preferable for the fumed silica to be added initially to the oligomer and mixed to disperse evenly therethrough. The fumed silica may be added the day before production. Once the fumed silica is dispersed the borosilicate glass, acrylic acid, and acrylamide are added and stirred until well dispersed. Last, the additional initiator and crosslinker/chain extender are added.

The coating composition is formed under a vacuum to the substantial exclusion of oxygen, and has a viscosity between 500 and 20,000 cps. The vacuum serves two purposes: it removes the air from the mixture and pulls voids out of the mixture. Substantially excluding oxygen by bubbling nitrogen through the mixture is preferable. It is not essential to have a completely inert atmosphere but it is preferable to limit oxygen to prevent retardation and premature termination of the polymerization reaction.

The oligomer composition may be prepared from the monomers by measuring out appropriate quantities of monomer and photoinitiator and placing in a mixing tank. The monomer is mixed in the mixing tank while nitrogen gas is discharged through a gas dispersion coil at the bottom of the tank. The monomer mixture is delivered via a metering pump at a predetermined flow rate to the bottom of a glass reactor. The monomer mixture travels from the bottom to the top of the glass reactor, and is partially polymerized by the four ultraviolet lamps. The resulting oligomer is discharged through an outlet at the top of the glass reactor into a storage tank. The remainder of the monomers, filler, initiator and hollow glass microspheres are added to the storage tank and mixed. The resulting coating composition may be initially blended with a propeller mixer and then blended with a homo-mixer to form a homogeneous mixture. The coating composition may be stored at this point. The coating composition is transferred to a feeding tank which utilizes a vacuum pump to remove the gas bubbles generated.

Subsequently, the coating composition is coated onto a first liner wherein the first liner is a release liner having a heat-activated adhesive disposed on one side thereof with a second liner contiguously covering the composition coated on the first liner to exclude air. The composition is coated directly onto the heat-activated adhesive disposed on the first liner. The methods for providing the heat-activated adhesive on a release liner is discussed hereinafter. The liner without the heat-activated adhesive is preferably silicone coated polyester films, and most preferably, the liner is a silicone coated polyethylene terephthalate liner. The thickness of the coating composition determines the thickness of the final foam-like backing. It does not matter whether the first or second liner has the heat-activated adhesive thereon as long as the adhesive comes into direct contact with the coating composition as it is polymerized. The result is identical: a permanent bond between the heat-activated adhesive and the foam-like sheet is formed.

Afterwards, the composition is polymerized while sandwiched between the liners forming an essentially uniform foam-like sheet having hollow glass microspheres evenly distributed therethrough. Two banks of ultraviolet lights are utilized in the invention to polymerize the foam-like sheet as it passes between the two banks. Preferably, the heat generated by the photopolymerization process is cooled down using a jet of cold air from an air-conditioning nozzle or other comparable methods which are well known in the art. The ultraviolet lamps used have wavelength ranges from about 300 nm to about 400 nm peaking at about 356.0 nm with the majority of the ultraviolet light being in the wavelength of 356 nm to 365 nm. The distance between the ultraviolet lamps and the foam surface in the preferred process is about 14.5 mm from the foam surface to the lower bank of lamps and about 17.0 mm from the foam surface to the upper bank of lamps. Preferably, each bank of lamps consists of 150 ultraviolet fluorescent lamps, such as Model No. F40/BL (40 W) available from Phillips®.

If a pressure-sensitive adhesive is desired on the second side of the foam-like sheet opposite the heat-activated adhesive, a primer may be applied to the second side of the foam-like sheet and dried. Suitable apparatuses for applying the primer to the surface of the second side of the foam-like sheet include, but are not limited to, mayer rod, kiss coater, and gravure roll. The primer is, preferably, composed of a mixture of 10% polyamide such as Macromelt 6238, 45% isopropyl alcohol, and 45% toluene. Although the solid contents in the primer mixture may range from 4 to 20%, 10% is typical. Any suitable primer may be utilized. Tailoring the primer to the particular adhesive used is desirable thereby assuring that the layer of adhesive will not become separated from the foam-like backing during use. The primer coated foam-like sheet may be stored for later use.

One of the suitable primers is a grafted natural rubber such as Heveatex H1330 which is diluted to between 5 and 50%, preferably 20%, dispersion with the same amount of isopropyl alcohol and toluene as polyamide based primers. Other primers include solutions of styrenic block copolymers and hydrocarbon elastomers. Examples of suitable primers include, but are not limited to, polyamide solution and emulsion, nitrile rubber based solution and emulsion, natural rubber based solution and emulsion, ethylene-propylene copolymer and ethylene-propylene-diene monomer terpolymer rubber based solution and emulsion, poly(ethylene-co-vinyl acetate solution and emulsion, poly(ethylene-co-vinyl acetate and alcohol) solution and emulsion, silane modified rubber and elastomer solutions, and combinations thereof.

An appropriate pressure-sensitive adhesive is applied to the surface of the foam-like sheet having the primer thereon, if present. Preferably, an acrylic adhesive is coated onto a release paper having silicone coated to both sides thereof, and the adhesive is cured in a conventional process. Alternatively, a polycoated, Kraft or a polyester liner, or any other appropriate release liner may be used instead of release paper. The adhesive is then laminated onto the primer treated surface of the foam-like sheet while removing the liner of the foam-like sheet from that surface. Laminating pressures applied between the foam-like sheet and the adhesive is 3 to 5 kg/cm$^2$, typically 4 kg/cm$^2$.

Preferably, both liners are removed from the foam-like sheet simultaneously. The paper liner may have a polyethylene release liner so that the paper liner is pealed off leaving the polyethylene release liner in place. Any suitable type of pressure-sensitive adhesive may be used including, but not limited to, acrylic, rubber-resin, and silicone based adhesives. Suitable solution acrylic adhesives include, but are not limited to, NSCC Duro-tak® 80-1105 LSE, Gelva® Multipolymer Solution 2933 or Gelva® Multipolymer Solution 2465 (Solutia, Inc.), Duro-tak® 80-1077, 80-1093, 80-1099 and 80-1096 (National Starch and Chemical, United States), Aroset® 1810, 1085, 280, 458, 390M, and 399 (Ashland Chemical, United States), and Gelva® Multipolymer Solutions 1753, 737 and 2659 and 2659 (Solutia Inc.).

Optionally, the second liner may be a release liner having a heat-activated adhesive disposed on one side thereof. So that the composition is polymerized between two layers of heat-activated adhesive forming a double-sided heat-activated adhesive tape. The heat-activated adhesive is strongly attached to the foam-like sheet of the present invention and will not separate readily.

The steps to make a heat-activated adhesive disposed contiguously on a release liner involve: coating the heat-activated adhesive onto a release liner, preferably a release coated polyester liner, and rolling the liner up so that it will be available for use. The liner can be any low surface energy film that allows ultraviolet light to pass through it. The release liner is then ready for subsequent use.

EXAMPLES

The simplest embodiment of the adhesive tape 10 according to the present invention is shown in FIG. 1. The foam-like backing 14 containing discrete hollow glass microspheres 12 with a heat-activated adhesive layer 16 thereon demonstrates the single-sided tape 10a of the invention. A release liner 18 is shown covering the heat-activated adhesive layer 16. It is to be understood that a release liner may be present covering any of the adhesives disposed on the tape whether heat-activated or pressure-sensitive. Furthermore, a release liner may not be present on any adhesive layer, or may be present on one adhesive layer and not the other adhesive layer for double-sided tapes.

Figure 2:
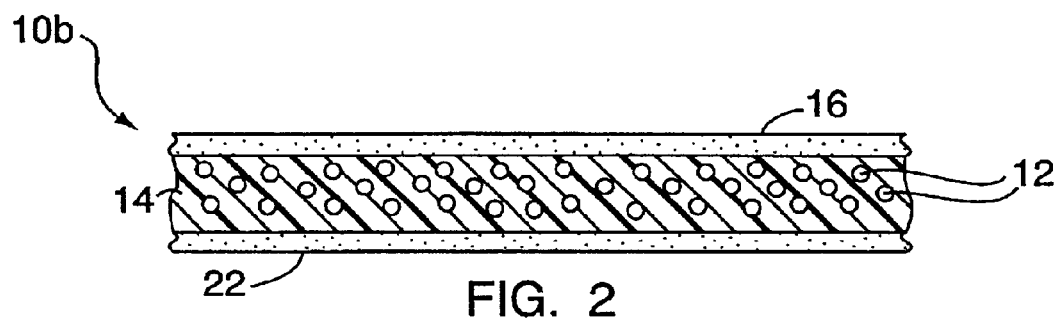
FIG. 2 is a cross-sectional view of another embodiment of the present invention.

FIG. 2 illustrates a double-sided heat-activated/pressure-sensitive adhesive tape 10b according to the present invention. In this embodiment, the foam-like backing 14 containing discrete hollow glass microspheres 12 has an heat-activated adhesive layer 16 and a pressure-sensitive adhesive layer 22 opposite the heat-activated adhesive layer 16. No release liner is shown on FIG. 2 but one or two release liners may be utilized with this embodiment.

An example of the second embodiment is 2 mils of the heat-seal adhesive Airflex 7200, which is suitable for bonding to ethylene-propylene-diene monomer rubber among other surfaces, was coated onto a silicone coated polyester release liner and was utilized to make a tape according to the present invention. The non-heat seal side of the sheet was primed using 20% dispersion of Heveatuf 1330 after removing the silicone liner therefrom. A second polycoated liner was coated with 3 mils of an adhesive suitable for bonding to painted metal, Solutia Gelva 2933, and laminated to the primed side of the sheet. Subsequently, the liner covering the heat-seal adhesive was removed resulting in a finished product with only one polycoated liner.

Figure 3:
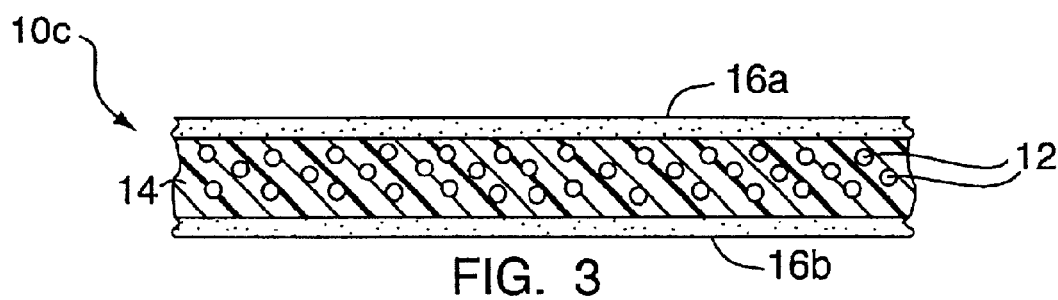
FIG. 3 is a cross-sectional view of yet another embodiment of the present invention.

FIG. 3 illustrates a double-sided heat-activated adhesive tape 10c according to the present invention. In this embodiment, the foam-like backing 14 containing discrete hollow glass microspheres 12 has two heat-activated adhesive layers 16a and 16b disposed thereon the backing opposite one another. No release liner is shown on FIG. 2 but one or two release liners may be utilized with this embodiment. It is to be noted here that the heat-activated layers 16a and 16b may be the same adhesive or different.

It is to be understood that the present invention is not limited to the embodiments described above, but encompasses any and all embodiments within the scope of the following claims.

What is claimed is:

1. An acrylic foam-like adhesive tape comprising:
    (a) a layer of an acrylic foam-like backing comprising
        (i) from about 88% to about 92% of an acrylic polymer comprising:
            from about 35% to about 45% of a first alkyl acrylate monomer having alkyl groups which contain from 4 to 12 carbon atoms,
            from about 30% to about 40% of a second alkyl acrylate monomer having alkyl groups which contain from 4 to 12 carbon atoms,
            from about 6% to about 10% of a first monoethylenically unsaturated polar copolymerizable monomer, and
            from about 1% to about 2% of a second monoethylenically unsaturated polar copolymerizable monomer; and
        (ii) from about 8% to about 12% of hollow glass microspheres dispersed evenly in said polymer;
    (b) a layer of a heat-activated adhesive disposed on one side of the backing, said heat-activated adhesive comprising a polyamide, a polyester, a polyolefin, a urethane, a polyurethane, a block copolymer, an elastomer, a block copolymer rubber, or a combination of the foregoing materials; and
    (c) a layer of pressure sensitive adhesive disposed on the other side of the backing opposite the layer of said heat-activated adhesive.

2. The acrylic foam-like adhesive tape according to claim 1, wherein the acrylic polymer includes from about 0.3% to about 0.5% of initiator.

3. The acrylic foam-like adhesive tape according to claim 2, wherein the initiator comprises at least one photoinitiator.

4. The acrylic foam-like adhesive tape according to claim 1, wherein the acrylic polymer includes from about 0.05% to about 0.07% of a crosslinker/chain extender.

5. The acrylic foam-like adhesive tape according to claim 4, wherein the crosslinker/chain extender is a multifunctional acrylate.

6. The acrylic foam-like adhesive tape according to claim 4, wherein the crosslinker/chain extender is a multi-ethylenically unsaturated copolymerizable monomer containing at least two carbon-carbon double bonds.

7. The acrylic foam-like adhesive tape according to claim 4, wherein:
the crosslinker/chain extender is taken from the group consisting of ethlene glycol diacrylate, triethylene glycol diacrylate, 1,4-butanediol diacrylate, 1,6-hexanediol diacrylate, trimethylolpropane triacrylate, pentaerythritol triacrylate, and methacrylates and combinations thereof.

8. The acrylic foam-like adhesive tape according to claim 4, wherein: the crosslinker/chain extender is tetraethylene glycol diacrylate or its dimethacrylate.

9. The acrylic foam-like adhesive tape according to claim 1, wherein the acrylic polymer includes from about 1% to about 2% of a filler.

10. The acrylic foam-like adhesive tape according to claim 9, wherein the filler is a fumed silica.

11. The acrylic foam-like adhesive tape according to claim 9, wherein the filler is a surface modified silica.

12. The acrylic foam-like adhesive tape according to claim 1, wherein:
the first alkyl acrylate monomer is isooctylacrylate, the second alkyl acrylate monomer is 2-ethylhexyl acrylate, the first monoethylenically unsaturated polar copolymerizable monomer is acrylic acid, the second monoethylenically unsaturated polar copolymerizable monomer is acrylamide, and the hollow glass microspheres are borosilicate glass.

13. The acrylic foam-like adhesive tape according to claim 12, wherein the acrylic polymer further comprises:
from about 0.3% to about 0.5% of initiator,
from about 1% to about 2% of a filler, and
from about 0.05% to about 0.07% of a crosslinker/chain extender.

14. The acrylic foam-like adhesive tape according to claim 13, wherein the initiator comprises at least one photoinitiator.

15. The acrylic foam-like adhesive tape according to claim 14, wherein the photoinitiator is benzoin ethyl ether.

16. The acrylic foam-like adhesive tape according to claim 12, wherein the filler is fumed silica.

17. The acrylic foam-like adhesive tape according to claim 12, wherein the filler Is a surfaced modified silica.

18. The acrylic foam-like adhesive tape according to claim 12, wherein the crosslinker/chain extender is 1,4 butanediol diacrylate.

19. The acrylic foam-like adhesive tape according to claim 12, wherein the acrylic foam-like backing comprises:
from about 40% to about 41% isooctylacrylate;
from about 36% to about 37% 2-ethylhexyl acrylate;
from about 8% to about 9% acrylic acid;
from about 1% to about 2% acrylamide; and
from about 10% to about 11% borosilicate glass.

20. The acrylic foam-like adhesive tape according to claim 19, wherein the acrylic foam-like backing further comprises:
from about 0.35% to about 0.45% benzoin ethyl ether;
from about 1% to about 2% fumed silica; and
from about 0.055% to about 0.065% 1,4 butanediol diacrylate.

21. The acrylic foam-like tape according to claim 1, wherein the foam-like backing further comprises:
a sufficient amount of colorant to depart color to the adhesive tape.

* * * * *